Feb. 16, 1932.　　　J. KAULKE　　　1,845,796
MICROSCOPE
Filed Feb. 7, 1930
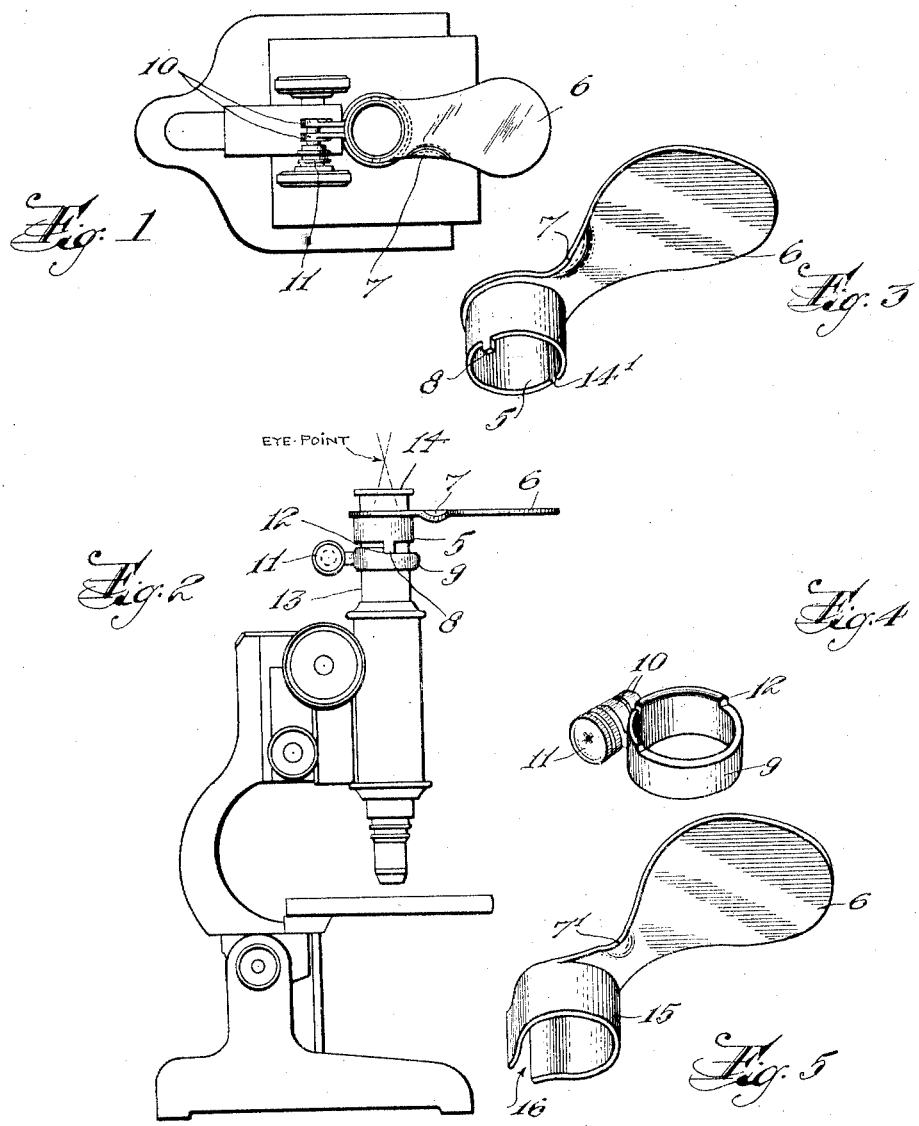
INVENTOR.
Johannes Kaulke
BY Fred C. Fischer
ATTORNEY Patented Feb. 16, 1932

1,845,796

UNITED STATES PATENT OFFICE

JOHANNES KAULKE, OF NEWARK, NEW JERSEY

MICROSCOPE

Application filed February 7, 1930. Serial No. 426,501.

This invention relates to microscopes and more particularly to an attachment designed to facilitate the use of microscopes.

It is well known that the best results are obtained with microscopes when the manipulator keeps both of his eyes open. In fact, manufacturers of microscopes specifically advise that a habit be made at the outset of keeping both eyes open. When both eyes are kept open, there is less fatigue and the vision of the manipulator is not hindered as is the case when one eye is closed.

However, it has been found difficult to keep both eyes open while using a microscope for the reason that one eye is concentrated on the object being viewed through the microscope, while the other eye views the objects surrounding the microscope. Consequently, the two eyes convey distinct impressions to the brain and the result is confusing.

It is an object of this invention to provide an attachment for microscopes in the nature of a shield positioned adjacent the eye-piece to facilitate using the microscope with both eyes open.

A further object is the provision of an attachment for microscopes having a nose rest by means of which the hand of the manipulator may be steadied during his observations.

It is well known that there is a point just above the eye piece called the "eye point" so that rays cross within the smallest compass, and this is the proper position for the eye, as the largest number of rays enter it. When above or below this point the size of field will be reduced or shadows or colors will appear in it. In low power eye pieces, the eye point is some distance from the lens and in high power eyepieces, close to it.

In fact, in some, so close that the eye lashes rest upon the lens and sometimes appear in the field as bars. Therefore, a further object of the invention is to provide an attachment for microscopes having a nose rest and which, when once adjusted on the microscope, will maintain the eye point in proper position.

These and other advantages, which will later appear, are accomplished by the simple and practical construction and arrangement of parts hereinafter described and exhibited in the accompanying drawings, forming part hereof, and in which:

Figure 1 represents a plan view of a microscope having the attachment mounted thereon.

Figure 2 represents an elevational view of a microscope with the attachment.

Figure 3 represents a perspective view of an element of the attachment.

Figure 4 represents a perspective view of a clamp collar used in the atatchment.

Figure 5 represents a perspective view of a modified form of the invention.

Referring to the drawings, the attachment is shown to include a collar 5 having integral therewith a laterally projecting shield 6, which has a depressed portion 7 adapted to accommodate a nose. The lower edge of the collar is provided with a lug 8 which is adapted to engage shoulders 12 on a clamp collar 9 for a purpose hereinafter to be described.

The clamp collar 9 is provided with a pair of ears 10, one of said ears being internally threaded to receive a screw which may be manipulated by a knurled knob 11.

Referring to Figure 2, it is seen that the clamp collar 9 and the collar 5 are mounted on the draw-tube 13 of a microscope adjacent the eye piece 14. The collar 5 and the shield 6 may be adjustably positioned on the draw-tube by varying the position of the clamp collar 9.

In operation, the eye piece 14 is removed from the draw-tube 13 upon which are placed the clamp collar 9 and the collar 5. The eye piece 14 is then inserted in the draw-tube and the shield 6 is moved to a desired position adjacent the eye piece and in proper relation to the eye point of the instrument, and maintained in such position by tightening the clamp 9 upon the draw-tube 13.

The manipulator may now view objects through the microscope and maintain both of his eyes open without fatigue as the shield 6 presents to one eye a blank surface and covers up the objects surrounding the telescope.

At the same time the operator may work more efficiently by resting his nose upon the depression 7 in the shield 6, which action steadies his head, and enables him to observe objects through the microscope for a considerable time without undue fatigue.

When the instrument is used in a horizontal position, the shield is prevented from rotating on the draw-tube by the engagement of lug 8 with one of the shoulders 12 on the clamp 9.

While being used in a vertical position, the collar 5 of the shield resiliently grips the draw-tube, and it is not necessary to employ the clamp collar 9. As shown in Figure 3, the collar 5 is split longitudinally at 14', and the diameter of collar 5 is slightly less than the diameter of the draw-tube 13, so that the collar 5 will frictionally and resiliently grip the draw-tube 13.

In Figure 5 is shown a modified form of the device, in which the shield 6 is provided with a nose rest 7', and a resilient forked collar 15 having an opening at 16. This form may be slipped onto a draw-tube laterally without necessitating the removal of the eye-piece.

From the above description it will be seen that I have provided a simple attachment for microscopes which will enable them to be used more efficiently and with less fatigue, than has heretofore been possible.

When it is desired to use the microscope in a horizontal position, the shield 6 will be maintained in a proper position by the engagement of the lugs 8 with the shoulders 12 on the clamp collar 9.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In combination with a microscope an attachment for enabling the microscope to be used with both eyes open, comprising a shield having an integral collar fitting over the draw-tube of the microscope, a clamping collar for maintaining the shield in adjusted positions on the draw-tube, shoulders on the clamping collar, lugs on the first named collar adapted to engage said shoulders to limit rotary movement of the shield, and means on the shield for engaging the nose of the manipulator whereby the head will be steadied while making observations through the microscope.

2. In combination with a microscope, an attachment for enabling the microscope to be used with both eyes open, comprising a shield having an integral collar fitting over the draw-tube of the microscope, a clamping collar for maintaining the shield in adjusted positions on the draw-tube, a shoulder on the clamping collar, and a lug on the first named collar adapted to engage said shoulder to limit rotary movement of the shield.

3. In combination with a microscope, an attachment for enabling the microscope to be used with both eyes open, comprising a shield having an integral collar fitting over the draw-tube of the microscope, a clamping collar for maintaining the shield in adjusted positions on the draw-tube, and means on said collars to limit rotary movement of the shield.

This specification signed this 24th day of January, 1930.

JOHANNES KAULKE.